United States Patent
Whittle et al.

(10) Patent No.: US 9,369,429 B1
(45) Date of Patent: Jun. 14, 2016

(54) ASSOCIATING TEXT STRINGS WITH NUMERIC NUMBERS FOR IP ADDRESS MANAGEMENT

(75) Inventors: Steven Whittle, Redwood City, CA (US); Etienne M. Liu, San Jose, CA (US); Frederic Andrew Voltmer, Palo Alto, CA (US); Barry Arlen Frew, Carmel, CA (US)

(73) Assignee: Infoblox Inc., Santa Clara, CA (US)

(*) Notice: Subject to any disclaimer, the term of this patent is extended or adjusted under 35 U.S.C. 154(b) by 1192 days.

(21) Appl. No.: 13/335,680

(22) Filed: Dec. 22, 2011

(51) Int. Cl.
*G06F 12/10* (2006.01)
*H04L 29/06* (2006.01)
*H04L 29/12* (2006.01)

(52) U.S. Cl.
CPC ............ *H04L 61/25* (2013.01); *H04L 61/2596* (2013.01); *H04L 61/301* (2013.01); *H04L 61/6072* (2013.01); *H04L 61/609* (2013.01)

(58) Field of Classification Search
CPC .............. H04L 61/6072; H04L 61/609; H04L 61/1529; H04L 61/157; H04L 61/25; H04L 61/2596; H04L 61/301; H04L 65/308; H04L 61/6059
See application file for complete search history.

(56) References Cited

U.S. PATENT DOCUMENTS

| | | | | |
|---|---|---|---|---|
| 6,347,085 | B2* | 2/2002 | Kelly | H04L 29/06 370/352 |
| 6,594,254 | B1* | 7/2003 | Kelly | H04L 29/12066 370/352 |
| 7,010,302 | B1* | 3/2006 | Nakajima | H04L 29/1216 370/331 |
| 7,623,547 | B2 | 11/2009 | Dooley et al. | |
| 8,230,071 | B1 | 7/2012 | Quilter et al. | |
| 9,130,798 | B1* | 9/2015 | Mirza | H04K 29/06 |
| 2002/0083198 | A1* | 6/2002 | Kim | H04L 29/12066 709/245 |
| 2002/0124066 | A1 | 9/2002 | Chang et al. | |
| 2003/0182448 | A1 | 9/2003 | Gooch et al. | |
| 2004/0177136 | A1 | 9/2004 | Chen et al. | |
| 2005/0041675 | A1* | 2/2005 | Trostle | H04L 29/12009 370/401 |
| 2007/0282983 | A1 | 12/2007 | Gujarathi et al. | |
| 2008/0244054 | A1 | 10/2008 | Schomp et al. | |
| 2012/0011229 | A1* | 1/2012 | Heller | H04L 61/6072 709/220 |

* cited by examiner

*Primary Examiner* — Aaron Strange
(74) *Attorney, Agent, or Firm* — Van Pelt, Yi & James LLP (57) ABSTRACT

Techniques for associating text strings with numeric numbers for IP address management are provided. In some embodiments, various techniques for an IPAM device for associating text strings with numeric numbers for IP address management are disclosed. In some embodiments, system, method, and/or computer program product for an Internet Protocol Address Management (IPAM) system for managing an Internet Protocol (IP) address space for an enterprise network, includes associating a text string with a substring of a network address; and storing the text string in association with the substring of the network address in the IPAM system for managing the IP address space for the enterprise network.

10 Claims, 7 Drawing Sheets

ASSOCIATING TEXT STRINGS WITH NUMERIC NUMBERS FOR IP ADDRESS MANAGEMENT

BACKGROUND OF THE INVENTION

Internet Protocol address management (IPAM) generally refers to the planning, tracking, and/or managing the Internet Protocol address space used in an Internet Protocol (IP) based network. IPAM tools generally include devices, such as software executed on computing systems such as servers or appliances, that perform IPAM related activities and/or tasks. In some cases, tools such as domain name server (DNS) tools and dynamic host control protocol (DHCP) tools are used in tandem to perform IPAM related tasks.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Internet Protocol address management (IPAM) generally refers to the planning, tracking, and/or managing the Internet Protocol address space used in an Internet Protocol (IP) based network. IPAM tools generally include devices, such as software executed on computing systems such as servers or appliances or virtual appliances, that perform IPAM related activities and/or tasks. In some cases, tools such as domain name server (DNS) tools and dynamic host control protocol (DHCP) tools are used in tandem to perform IPAM related tasks.

IPAM tools are increasingly important for effectively and efficiently managing IP based networks as, for example, new IPv6 networks are deployed with larger address pools, different subnetting techniques are employed, and more complex 128-bit hexadecimal numbers, which are not as easily human-readable as IPv4 addresses, are allocated. For example, IPv6 networking, mobile computing, and multi-homing generally require more dynamic address management and, as a result, are rendering impractical early generation techniques of IP address management (IPAM) software and spreadsheets that were typically used for IP address management.

Larger enterprises generally have larger IP address space(s) and are more commonly using IPv6 network addressing. Larger enterprises also often have networks that can be geographically diverse (e.g., spanning across multiple floors or buildings within an office complex, multiple offices, multiple regions, and so forth). As a result, such entities may not have adequate visibility into their entire IP address space as their IP addressing can be very complicated, with a significant number of devices and networks, which are addressed using IPv6 networking Managing or identifying devices or networks in IPv6 environments and/or allocating new IP addresses for new devices or networks can be a very complex, difficult, and time consuming task.

What are needed are new and improved techniques for associating text strings with numeric numbers for IP address management.

Accordingly, new and improved techniques for associating text strings with numeric numbers (e.g., network naming) for IP address management (e.g., for an enterprise network) are provided. In addition, new and improved techniques for associating text strings with numeric numbers for IP address management using vendor based Media Access Control (MAC) address information are also disclosed.

For example, various techniques described herein facilitate an enhanced understanding and improved management of IPv6 networks, which are otherwise not as easily human-readable as IPv4 addresses. In particular, with the introduction of IPv6, it is generally very difficult for network managers/administrators to memorize addresses or understand the relationship between various different network addresses and their associated networks. This problem also generally applies to the host portion of a network address, which usually includes the MAC address, as further described herein. Thus, various techniques described herein facilitate network managers' understanding by, for example, associating human/user friendly names for networks and host devices. As a result, the various technique described herein can be used to facilitate the management of networks as further described below with respect to various embodiments.

In some embodiments, various techniques for an IPAM device for associating text strings with numeric numbers for IP address management are disclosed. In some embodiments, system, method, and/or computer program product for an Internet Protocol Address Management (IPAM) system for managing an Internet Protocol (IP) address space for an enterprise network (e.g., of an enterprise), includes associating a text string with a substring of a network address; and storing the text string in association with the substring of the network address in the IPAM system for managing the IP address space.

In some embodiments, various techniques for an IPAM device for associating text strings with numeric numbers for IP address management using vendor based MAC address information are disclosed. In some embodiments, system, method, and/or computer program product for an Internet Protocol Address Management (IPAM) system for managing an Internet Protocol (IP) address space for an enterprise network (e.g., of an enterprise), includes associating a first name with a first substring of a network address of a host device; associating a second name with a second substring of the network address of the host device; associating a vendor name with a third substring of the network address of the host device, wherein the vendor name is determined based on Media Access Control (MAC) address; and storing the first name, the second name, and the vendor name in association with the network address in the IPAM system for managing the IP address space.

Figure 1A:
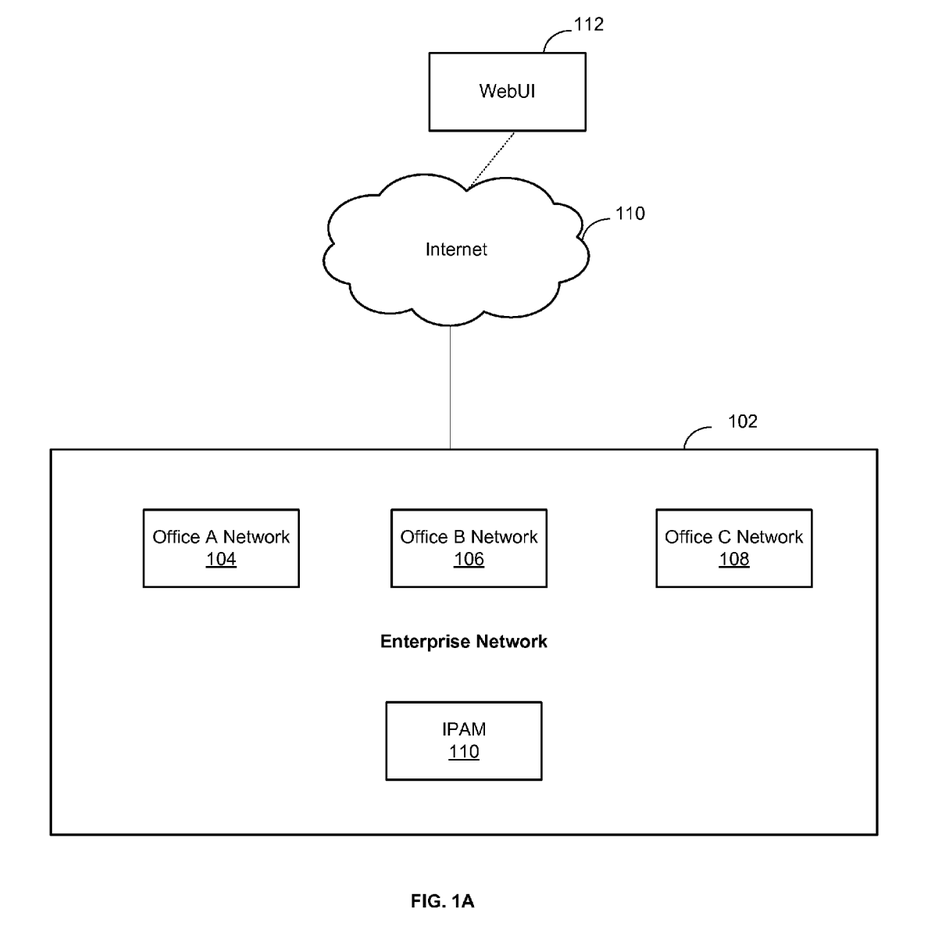
FIG. 1A illustrates a network architecture for associating text strings with numeric numbers for IP address management in accordance with some embodiments.

FIG. 1A illustrates a network architecture for associating text strings with numeric numbers for IP address management in accordance with some embodiments. As shown, an enterprise network 102 includes various subnetworks for different offices, which as shown include Office A Network 104, Office B Network 106, and Office C Network 108 (e.g., which can be in different geographical locations). The enterprise network 102 also includes an Internet Protocol Address Management (IPAM) system 110 for managing an Internet Protocol (IP) address space for the enterprise network 102 of an enterprise (e.g., including managing the IP address space for the subnetworks 104, 106, and 108 and the various host devices on the enterprise network 102 including the subnetworks 104, 106, and 108). For example, various authorized users, such as authorized network administrators or network managers can access the IPAM system through a WebUI 112 (e.g., web based user interface, which provides a graphical user interface (GUI), and which can be accessed via various web browsers) via a network, such as the Internet 110 as shown.

In some embodiments, the network architecture as shown in FIG. 1A, or other similar network architectures as will now be apparent to one of ordinary skill in the art in view of the disclosed embodiments, can be used for management of IPv6 network numbers as described below. IPv6 networks generally include three primary components: a Global Routing Prefix (GRP), a Subnet ID, and an Interface ID. Each of these components is expressed in hexadecimal digits. In some embodiments, using various techniques for an IPAM device for associating text strings with numeric numbers for IP address management allows users (e.g., network administrators and/or network managers) of a management application (e.g., an IPAM device) to substitute user friendly names for one or more components of the IPv6 address. For example, a user can substitute the global routing prefix with the company name (e.g., COMPANY_NAME) and the Subnet ID with a location (e.g., BUILDING_NUMBER). In this example, an IPv6 network can be expressed as COMPANY_NAME:BUILDING_NUMBER/64.

For example, by substituting text strings, such as names, for the numbers of one or more components of the IPv6 address of a network or device, such network addresses can be more easily understood. This approach also can make troubleshooting easier for network issues, because a person is able to intuitively understand the relationships between such named networks/named network devices and the use, location, and/or function of such named networks/named network devices.

Figure 1B:
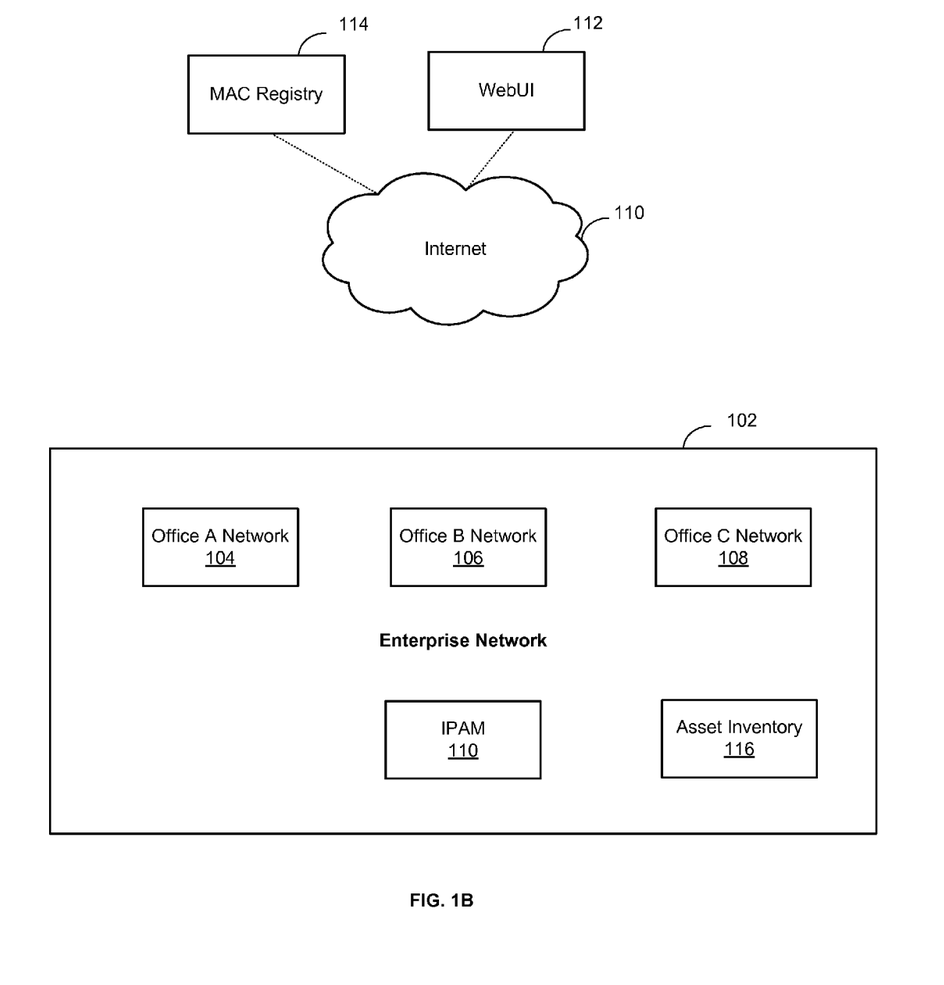
FIG. 1B illustrates a network architecture for associating text strings with numeric numbers for IP address management using vendor based MAC address information in accordance with some embodiments.

FIG. 1B illustrates a network architecture for associating text strings with numeric numbers for IP address management using vendor based MAC address information in accordance with some embodiments. As shown, the enterprise network 102 also includes an asset inventory 116 (e.g., an asset inventory data store, such as an asset inventory database or system). As also shown, the IPAM system 110 is in communication with a MAC registry 114 via the Internet 110.

In some embodiments, the network architecture as shown in FIG. 1B, or other similar network architectures as will now be apparent to one of ordinary skill in the art in view of the disclosed embodiments, can be used for management of IPv6 network numbers using vendor based MAC address information as described below. In IPv6 addressing, the host portion of a network typically includes the hardware address (e.g., Media Access Control (MAC) address). IPv6 implements additional features not present in IPv4, which simplifies aspects of address assignment by providing for StateLess Address AutoConfiguration (SLAAC). A host identifier portion of an address that includes the hexadecimal digits FFFE in its middle quartet of the 64 bits (i.e., as the last two digits of the second block and the first two digits of the third block of the host portion of the IPv6 address) is typically a SLAAC generated address. In other words, if an IPv6 address contains the MAC address of the client (e.g., host device), it will contain the hex digits FFFE as the last two digits of the second block and the first two digits of the third block of the host portion of the IPv6 address.

A MAC address also generally includes two separate components, a vendor ID and a unique identifier. The vendor ID generally is a unique number allocated to the manufacturer of the network card by the Institute of Electronics and Electrical Engineers (IEEE). The vendor ID is publicly available information. In some embodiments, a text string is provided to replace the vendor name (e.g., as shown in a UI for IP address management). For example, this approach can help network administrators more easily understand the types of devices that are on the network without needing to memorize or manually look up the vendor ID. For example, using this technique for vendor ID naming substitution for the MAC address (e.g., VENDOR_NAME) combined with the network naming technique discussed above, a network device can be displayed in a UI of an IPAM device as follows: COMPANY_NAME:BUILDING_NUMBER:VENDOR_NAME:OF:12de:74ac. Also, a unique device name can be associated with a remaining portion of the network address (e.g., USER_NAME_LAPTOP or HQ_FLOOR#_PRINTER_NAME), or combined with the previous example, the following substituted host device name can be provided (e.g., for display/presentation on a GUI, such as WebUI 112/212) as COMPANY_NAME:BUILDING_NUMBER:VENDOR_NAME: USER_NAME_LAPTOP or HQ_FLOOR#_PRINTER_NAME.

In some embodiments, the MAC address is extracted from the IPv6 address of a host device, and this information is correlated with an asset inventory, such as asset inventory 116 as shown in FIG. 1B. For example, this information can be correlated with the asset information stored in the asset inventory 116 (e.g., which includes assets for the enterprise, including MAC address information for each asset) for security purposes (e.g., hosts whose MAC address is not in the asset database can be quarantined, that is, given limited or no access to network resources using various network access control techniques). The MAC address can also be used to retrieve other information from the asset database to populate data into an IP address management application (e.g., IPAM system 110).

Accordingly, as described herein, various techniques can be used to determine that an IPv6 address is a SLAAC generated address, to extract the MAC address from the host portion of the SLAAC generated address, and then to determine the manufacturer associated with the extracted MAC address. For example, a MAC vendor prefix lookup can be communicated over the Internet to a MAC registry 114 for the MAC vendor prefix lookup as shown in FIG. 1B.

In some embodiments, a system, method, and/or computer program product for the IPAM system 110 for managing the IP address space of the enterprise network 110 includes associating a first name with a first substring of a network address of a host device; associating a second name with a second substring of the network address of the host device; associating a vendor name with a third substring of the network address of the host device, in which the vendor name is determined based on a MAC address; and storing the first name, the second name, and the vendor name in association with the network address in the IPAM system 110 for managing the IP address space for the enterprise network 102. In some embodiments, the network address is an Internet Protocol version 6 (IPv6) network address generated using SLAAC. In some embodiments, a MAC vendor prefix registry for SLAAC address decoding is stored (e.g., in the MAC Registry 114, in the IPAM system 110, and/or another data store).

In some embodiments, the system, method, and/or computer program product for the IPAM system 110 for managing the IP address space of the enterprise network 110 further includes decoding the network address to determine that the network address is an IPv6 network address generated using SLAAC; extracting the MAC address to determine the vendor name; communicating with a MAC registry over a network to perform a MAC address lookup; and determining the vendor name associated with the MAC address based on the MAC address lookup.

In some embodiments, the system, method, and/or computer program product for the IPAM system 110 for managing the IP address space of the enterprise network 110 further includes decoding the network address to determine that the network address is an IPv6 network address generated using SLAAC; extracting the MAC address to determine the vendor name; communicating over a network with an asset inventory for the enterprise to perform an asset verification lookup for the host device based on the extracted MAC address; determining that the host device is not included in the asset inventory for the enterprise based on the asset verification lookup; and performing an action based on the determination that the device is not included in the asset inventory for the enterprise.

In some embodiments, the system, method, and/or computer program product for the IPAM system 110 for managing the IP address space of the enterprise network 110 further includes transmitting for presentation one or more active devices on a network of an enterprise; and displaying an indicator for each of the one or more active devices on the network of the enterprise that are determined to not be included in asset inventory for the enterprise.

In some embodiments, the system, method, and/or computer program product for the IPAM system 110 for managing the IP address space of the enterprise network 110 further includes associating a unique device name with a remaining portion of the network address (e.g., USER_NAME_LAPTOP or HQ_FLOOR#_PRINTER_NAME).

Figure 2:
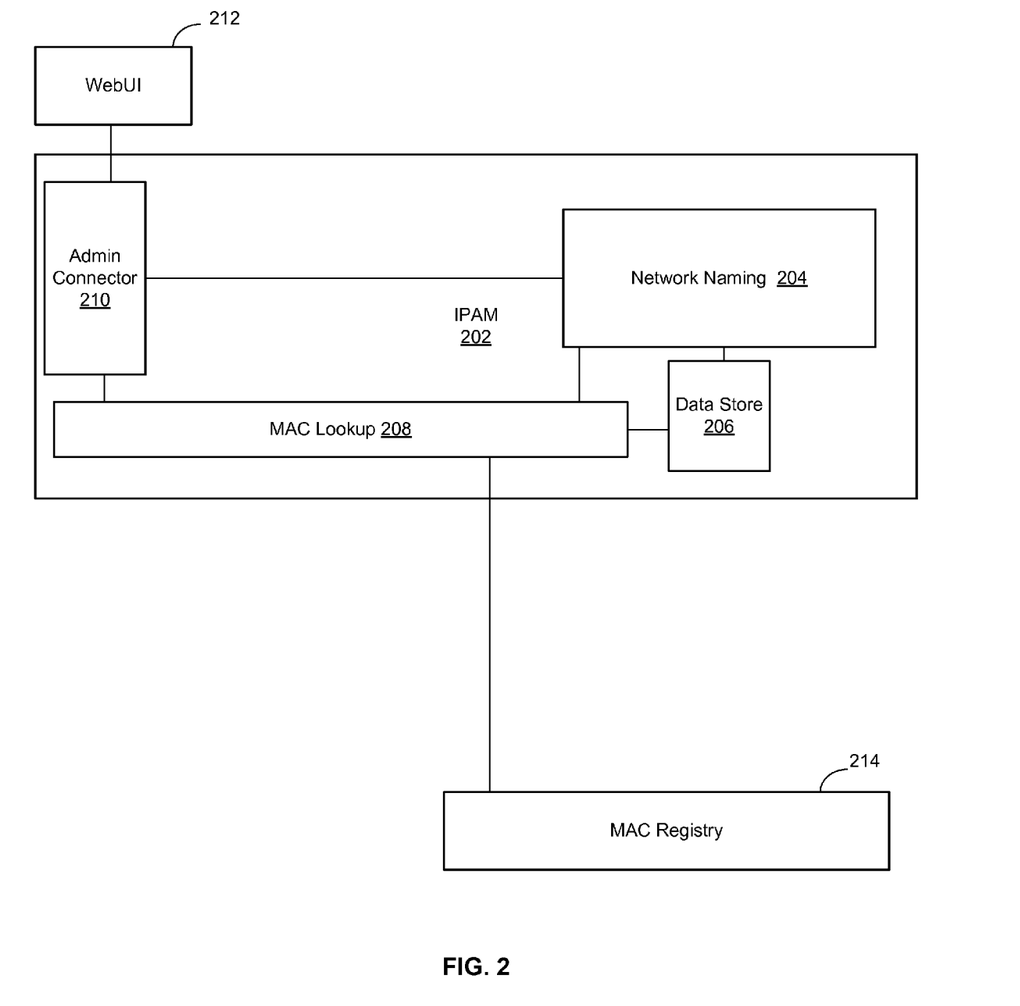
FIG. 2 illustrates a functional diagram of an IP Address Management (IPAM) device for associating text strings with numeric numbers for IP address management using vendor based MAC address information in accordance with some embodiments.

FIG. 2 illustrates a functional diagram of an IP Address Management (IPAM) device for associating text strings with numeric numbers for IP address management using vendor based MAC address information in accordance with some embodiments. As shown, an IPAM system 202 includes a network naming module 204 (e.g., implemented as software executed on a processor of an appliance, a virtual appliance, or a computer system), which implements the various network naming techniques described herein (e.g., various techniques for associating text strings with numeric numbers for IP address management and various techniques for associating text strings with numeric numbers for IP address management using vendor based Media Access Control (MAC) address information). The network naming module 204 is in communication with a data store 206 (e.g., a database or other data storage techniques), which stores text strings (e.g., network names) in association with substrings of network address as described herein. The network naming module 204 is also in communication with a MAC lookup module 208 (e.g., implemented as software executed on a processor of an appliance, a virtual appliance, or a computer system), and the MAC lookup module 208 is in communication with a MAC registry 214 (e.g., for performing various techniques for associating text strings with numeric numbers for IP address management using vendor based Media Access Control (MAC) address information as described herein) via a network, such as the Internet as shown in and as similarly described above with respect to FIG. 1B. The network naming module 204 is also in communication with an Admin Connector 210, which is in communication with a WebUI 212 via a network, such as the Internet as shown in and as similarly described above with respect to FIG. 1A. As will now be apparent to one of ordinary skill in the art in view of the disclosed embodiments, the functional architecture as shown in FIG. 2 or other similar functional architectures can be used for providing management of IPv6 network numbers using vendor based MAC address information as described herein.

Figure 3:
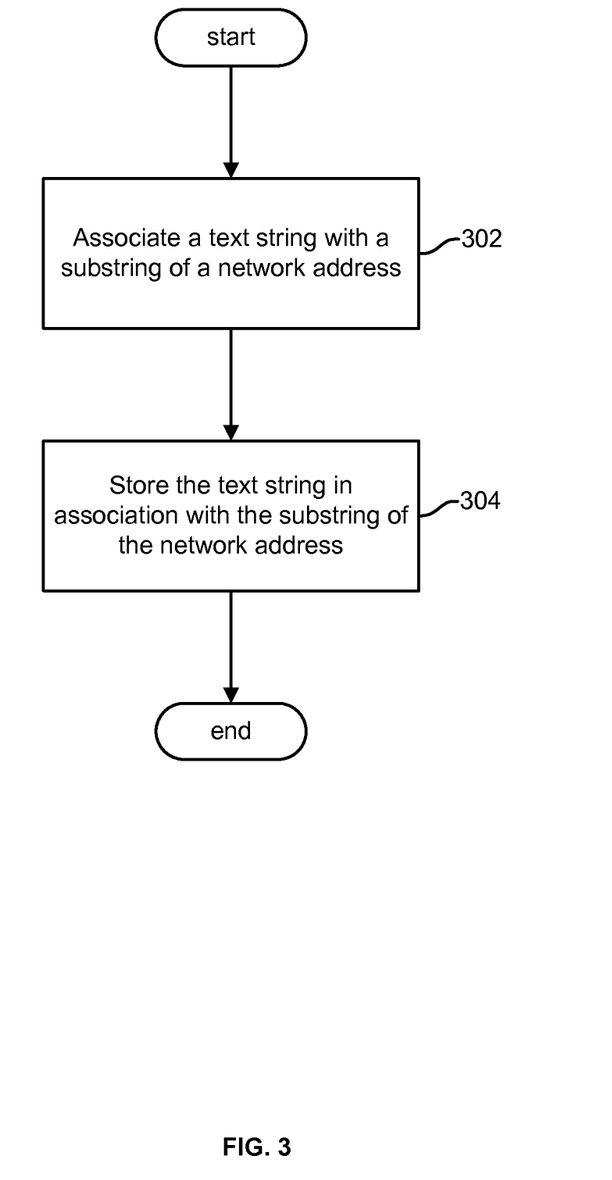
FIG. 3 illustrates a flow diagram for associating text strings with numeric numbers for IP address management in accordance with some embodiments.

FIG. 3 illustrates a flow diagram for associating text strings with numeric numbers for IP address management in accordance with some embodiments. In some embodiments, a process for an IPAM system for managing an IP address space for an enterprise network is shown in FIG. 3. At 302, associating a text string with a substring of a network address is performed. At 304, storing the text string in association with the substring of the network address in the IPAM system for managing the IP address space for the enterprise network is performed. In some embodiments, the network address is an Internet Protocol version 6 (IPv6) network address for a network. In some embodiments, the network address is an Internet Protocol version 6 (IPv6) network address for a host device. In some embodiments, the text string includes a network name for a global routing prefix of the network address for a network. In some embodiments, the text string indicates location or organizational information for a network. In some embodiments, the process further includes transmitting for presentation the text string substituted for the substring of the network address. In some embodiments, the process further includes displaying (e.g., in a GUI, such as WebUI 112/212) the text string substituted for the substring of the network address.

Figure 4:
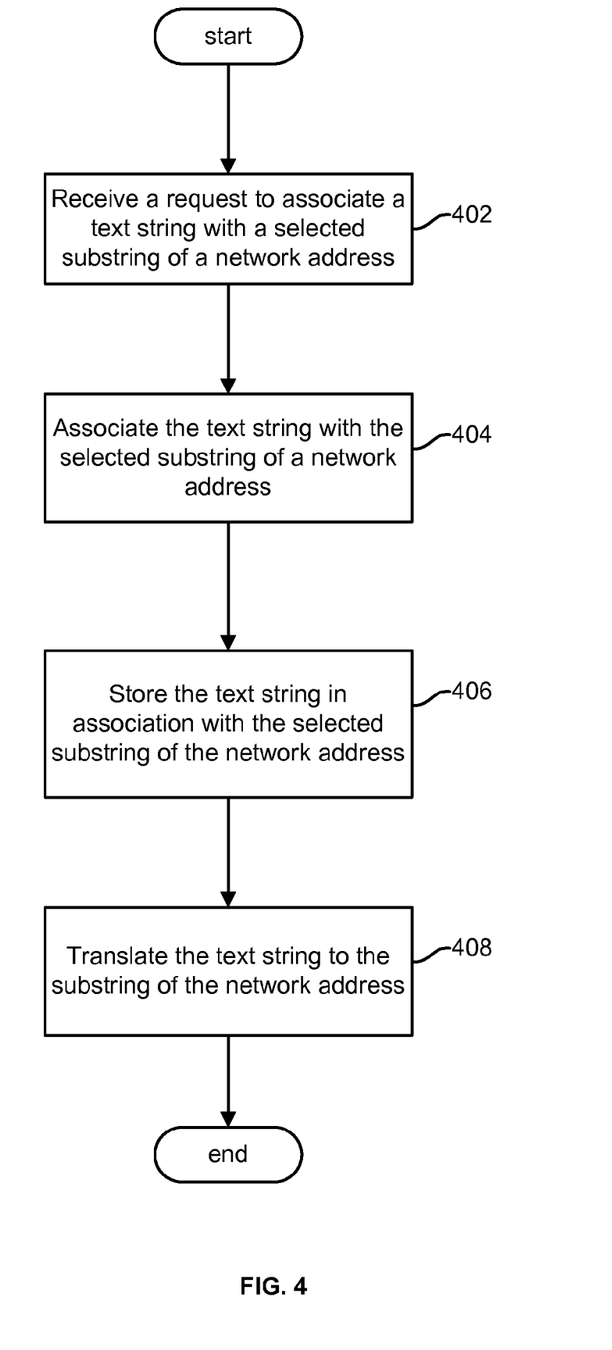
FIG. 4 illustrates another flow diagram for associating text strings with numeric numbers for IP address management in accordance with some embodiments.

FIG. 4 illustrates another flow diagram for associating text strings with numeric numbers for IP address management in accordance with some embodiments. In some embodiments, a process for an IPAM system for managing an IP address space for an enterprise network is shown in FIG. 4. At 402, a request is received to associate a text string with a selected substring of the network address, in which the selected substring of the network address corresponds to the substring of the network address. At 404, associating the text string with the selected substring of a network address is performed. At 406, storing the text string in association with the selected substring of the network address in the IPAM system for managing the IP address space for the enterprise network is performed. At 408, translating the text string to the substring of the network address (or vice versa) is performed (e.g., for display in a GUI, such as WebUI 112/212). In some embodiments, the process further includes mapping a set of network addresses for subnets of the enterprise network to a set of network names; and displaying in a graphical user interface the set of network addresses for subnets of the enterprise network mapped to the set of network names.

Figure 5:
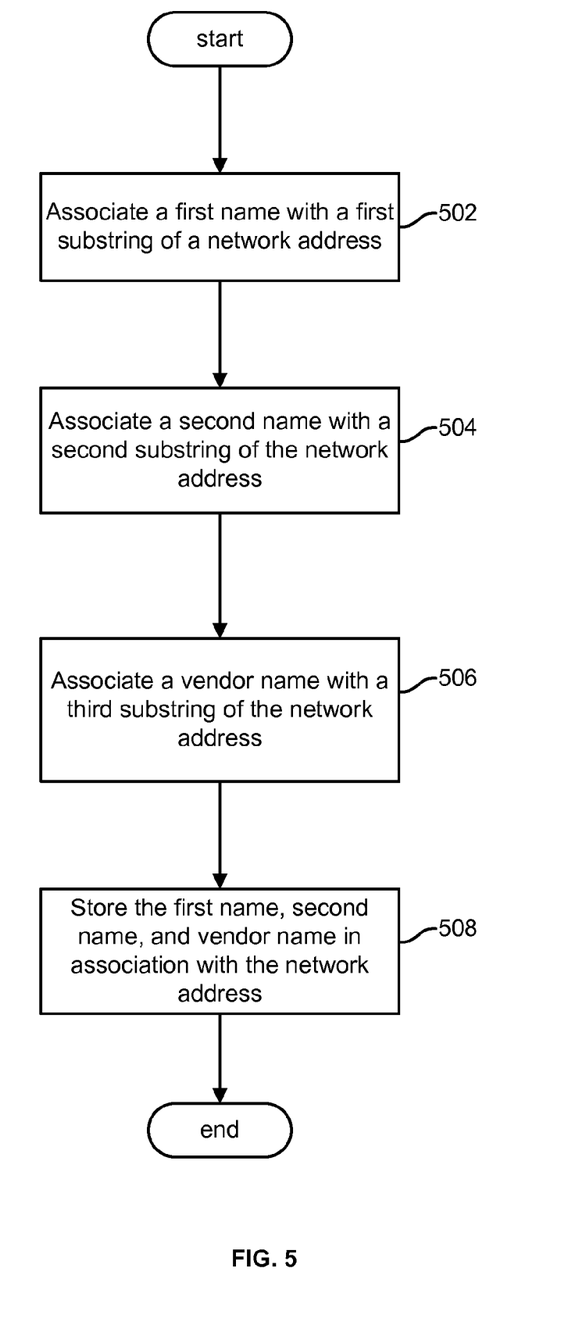
FIG. 5 illustrates a flow diagram for associating text strings with numeric numbers for IP address management using vendor based MAC address information in accordance with some embodiments.

FIG. 5 illustrates a flow diagram for associating text strings with numeric numbers for IP address management using vendor based MAC address information in accordance with some embodiments. In some embodiments, a process for an IPAM system for managing an IP address space using vendor based MAC address information for an enterprise network is shown in FIG. 5. At 502, associating a first name with a first substring of a network address of a host device is performed. At 504, associating a second name with a second substring of the network address of the host device is performed. At 506, associating a vendor name with a third substring of the network address of the host device, wherein the vendor name is determined based on Media Access Control (MAC) address is performed. At 508, storing the first name, the second name, and the vendor name in association with the network address in the IPAM system for managing the IP address space for the enterprise network is performed.

Figure 6:
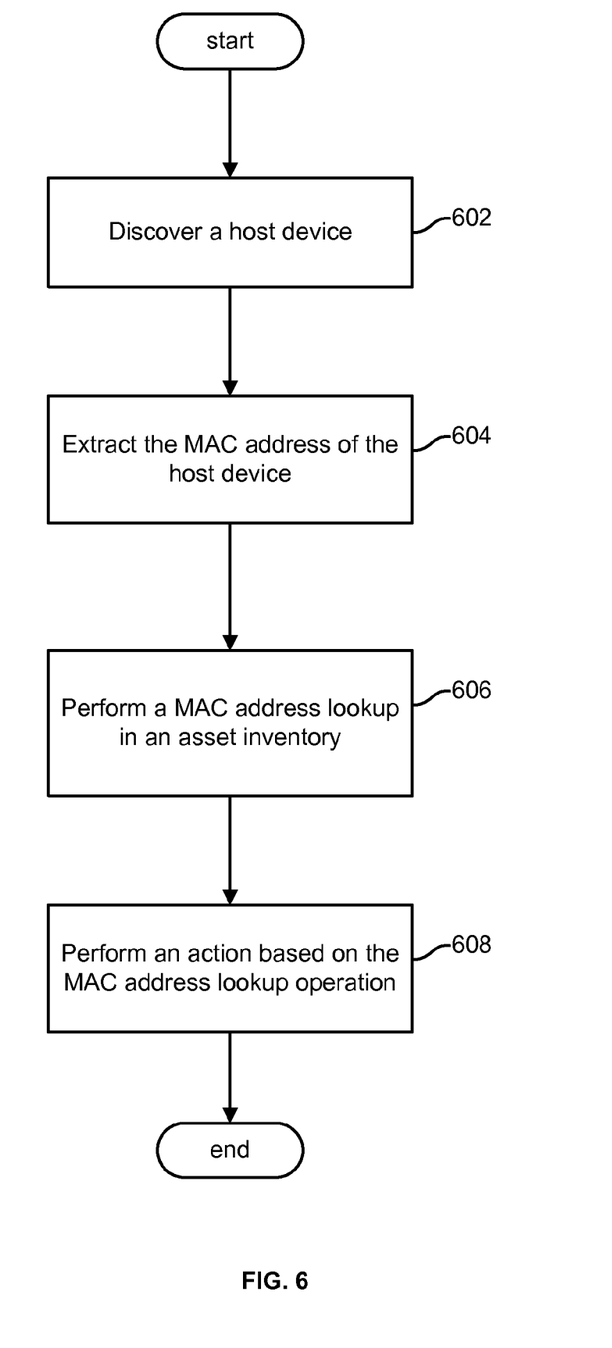
FIG. 6 illustrates another flow diagram for associating text strings with numeric numbers for IP address management using vendor based MAC address information in accordance with some embodiments.

FIG. 6 illustrates another flow diagram for associating text strings with numeric numbers for IP address management using vendor based MAC address information in accordance with some embodiments. At 602, a host device is discovered on an enterprise network. At 604, the MAC address of the host device is extracted. At 606, a MAC address lookup in an asset inventory (e.g., asset inventory 116) is performed. At 608, an action based on the MAC address lookup is performed. For example, if the host device is determined to be in the asset inventory, then no action is performed. If the host device is determined to not be in the asset inventory, then the host device can be quarantined or given limited or restricted access to the enterprise network (e.g., the host device can be isolated from the enterprise network automatically at a local switch or using various other network access control techniques).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An Internet Protocol Address Management (IPAM) system for managing an Internet Protocol (IP) address space of an enterprise network for an enterprise, comprising:
   a processor configured to:
      determine that a network address associated with a host device on the enterprise network is an IP version 6 (IPv6) network address;
      determine a Media Access Control (MAC) address for the host device on the enterprise network based on the IPv6 network address;
      perform a network communication with a MAC registry via an Internet communication to perform a MAC address lookup in a MAC registry to automatically determine a vendor name associated with the MAC address using a MAC lookup module;
      associate a first name with a first substring of the IPv6 network address of the host device;
      associate a second name with a second substring of the IPv6 network address of the host device;
      associate the vendor name with a third substring of the IPv6 network address of the host device, wherein the vendor name was determined based on the MAC address lookup in the MAC registry; and
      store the first name, the second name, and the vendor name in association with the IPv6 network address in the IPAM system for managing the IP address space for the enterprise network; and
   a memory coupled to the processor and configured to provide the processor with instructions.

2. The system recited in claim 1, wherein the IPv6 network address was generated using StateLess Address AutoConfiguration (SLAAC).

3. The system recited in claim 1, wherein the processor is further configured to:
   decode the network address to determine that the IPv6 network address was generated using StateLess Address AutoConfiguration (SLAAC); and
   extract the MAC address to automatically determine the vendor name.

4. The system recited in claim 1, wherein the processor is further configured to:
   decode the network address to determine that the IPv6 network address was generated using StateLess Address AutoConfiguration (SLAAC);
   extract the MAC address to automatically determine the vendor name;
   perform a network communication with an asset inventory for the enterprise to perform an asset verification lookup for the host device based on the extracted MAC address;
   determine that the host device is not included in the asset inventory for the enterprise based on the asset verification lookup; and
   perform an action based on determining that the host device is not included in the asset inventory for the enterprise.

5. The system recited in claim 1, wherein the processor is further configured to:
   transmit for presentation one or more active devices on the enterprise network; and
   display an indicator for each of the one or more active devices on the enterprise network that are determined to not be included in an asset inventory for the enterprise.

6. The system recited in claim 1, wherein the processor is further configured to:

associate a unique device name with a remaining portion of the IPv6 network address.

7. The system recited in claim 1, wherein the IPv6 network address includes hex digits FFFE as a last two digits of a second block and a first two digits of a third block of a host portion of the IPv6 network address.

8. The system recited in claim 1, wherein the processor is further configured to:
- decode the network address to determine that the IPv6 network address was generated using StateLess Address AutoConfiguration (SLAAC);
- extract the MAC address to automatically determine the vendor name;
- perform a network communication with an asset inventory for the enterprise to perform an asset verification lookup for the host device based on the extracted MAC address;
- determine that the host device is not included in the asset inventory for the enterprise based on the asset verification lookup; and
- quarantine the host device based on determining that the host device is not included in the asset inventory for the enterprise.

9. A method for an Internet Protocol Address Management (IPAM) system for managing an Internet Protocol (IP) address space for an enterprise network for an enterprise, comprising:
- determining that a network address associated with a host device on the enterprise network is an IP version 6 (IPv6) network address;
- determining a Media Access Control (MAC) address for the host device on the enterprise network based on the IPv6 network address;
- performing a network communication with a MAC registry via an Internet communication to perform a MAC address lookup in the MAC registry to automatically determine a vendor name associated with the MAC address using a MAC lookup module;
- associating a first name with a first substring of the IPv6 network address of the host device;
- associating a second name with a second substring of the IPv6 network address of the host device;
- associating the vendor name with a third substring of the IPv6 network address of the host device, wherein the vendor name was determined based on the MAC address lookup in the MAC registry; and
- storing the first name, the second name, and the vendor name in association with the IPv6 network address in the IPAM system for managing the IP address space for the enterprise network.

10. A computer program product for an Internet Protocol Address Management (IPAM) system for managing an Internet Protocol (IP) address space for an enterprise network for an enterprise, the computer program product being embodied in a non-transitory, computer readable storage medium and comprising computer instructions for:
- determining that a network address associated with a host device on the enterprise network is an IP version 6 (IPv6) network address;
- determining a Media Access Control (MAC) address for the host device on the enterprise network based on the IPv6 network address;
- performing a network communication with a MAC registry via an Internet communication to perform a MAC address lookup in the MAC registry to automatically determine a vendor name associated with the MAC address using a MAC lookup module;
- associating a first name with a first substring of the IPv6 network address of the host device;
- associating a second name with a second substring of the IPv6 network address of the host device;
- associating the vendor name with a third substring of the IPv6 network address of the host device, wherein the vendor name was determined based on the MAC address lookup in the MAC registry; and
- storing the first name, the second name, and the vendor name in association with the IPv6 network address in the IPAM system for managing the IP address space for the enterprise network.

* * * * *